W. A. ALLEN.
PRESSURE GAGE ATTACHMENT.
APPLICATION FILED NOV. 25, 1911. RENEWED NOV. 6, 1916.
1,227,563.
Patented May 29, 1917.
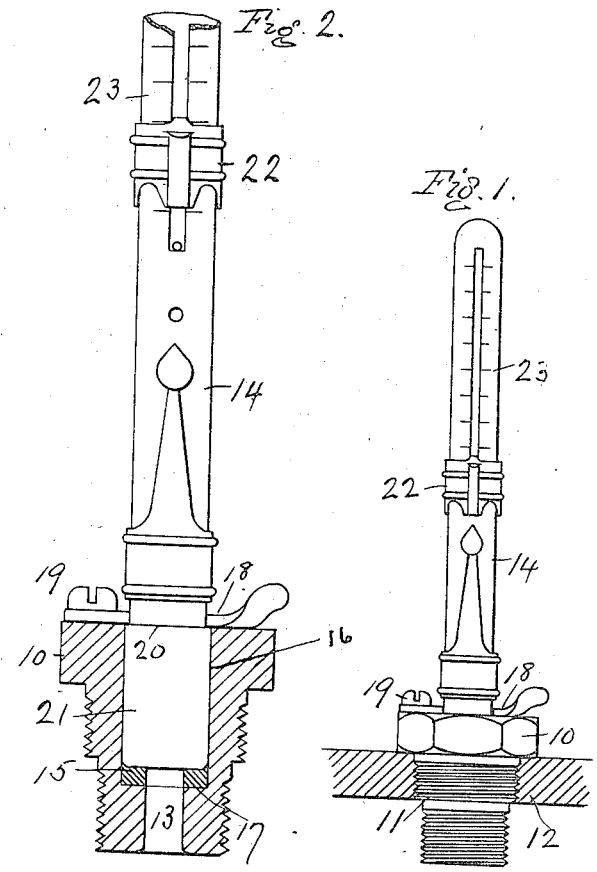
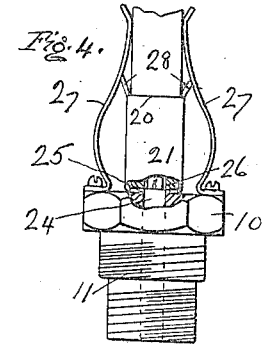
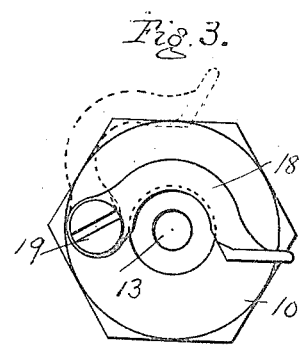
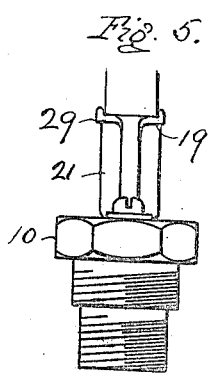

UNITED STATES PATENT OFFICE.

WILLIAM A. ALLEN, OF YONKERS, NEW YORK, ASSIGNOR TO A. SCHRADER'S SON, INCORPORATED, OF NEW YORK, N. Y., A CORPORATION OF NEW YORK.

PRESSURE-GAGE ATTACHMENT.

1,227,563.　　　　　Specification of Letters Patent.　　Patented May 29, 1917.

Application filed November 25, 1911, Serial No. 662,287. Renewed November 6, 1916. Serial No. 129,893.

*To all whom it may concern:*

Be it known that I, WILLIAM A. ALLEN, a citizen of the United States of America, and residing in the city of Yonkers, in the county of Westchester and State of New York, have invented a certain new and useful Improvement in Pressure-Gage Attachments, of which the following is a specification.

My present invention relates to an attachment for pressure gages by which an ordinary pressure gage commonly used for testing tires for automobiles, may be used for ascertaining the compression of the explosive mixture in the cylinder of an explosion engine.

In the accompanying drawings,

Figure 1 is a side elevation of one form of pressure gage and attachment adjusted in position upon an engine cylinder;

Fig. 2 is an enlarged section of the same partly broken away;

Fig. 3 is a plan of the attaching nut;

Figs. 4 and 5 are side elevations of modified forms of the device.

The cylinder of an explosion engine is commonly provided with a spark plug carried by a detachable nut, so that the plug may be readily removed for cleansing or renewal. In order to ascertain the compression of the explosion gases in the cylinder the customary procedure is to remove the spark plug and to screw into its threaded aperture in the explosion cylinder a pressure gage device specially constructed for this purpose. This device is of a more or less expensive nature, and forms an additional item of expense and care for the automobilist. I now propose to provide an attachment which may be inserted in the spark plug aperture and which is shaped to receive the attachment end of an ordinary tire pressure gage, and preferably provided with means for holding this gage in position during a test compression of the gases in the cylinder.

In the form shown in Figs. 1 to 3, I have illustrated a nut 10 with threaded shank 11, which is stepped to fit spark plug apertures of different diameters in the casing 12 of the explosion cylinder. A shouldered central bore 13 forms a passage for the gases from the cylinder 12 to the pressure gage 14 which is detachably mounted on the nut by inserting the lower end of the gage in an enlarged portion 16 of the bore until it comes to rest against the washer 15 on the shoulder 17 within the nut. The washer 15 prevents the escape of gases around the lower end of the gage, and insures their entry into the gage at undiminished pressure. To secure the gage in position during the test, it is sufficient that it be merely held down by hand against the washer, but I prefer to provide a latch 18 pivoted at 19 on the upper face of the nut and shaped to the curvature of the gage so that when the latch is swung into engaging position it overlies the shoulder 20 of the thimble 21 at the lower end of the gage and thus retains the latter in position. The tire gage illustrated being of the type shown in the Lyhne Patent No. 994,701, which is commonly provided with a thimble 21 over which the latch 18 may readily catch to hold the gage in position in the nut 10, the gases in the cylinder when put under compression, force out the indicating sleeve 22 and the latter remains in indicating position upon the scale 23 after the cylinder has been exhausted.

In the modification illustrated in Fig. 4, the nut is provided with a central bore 24 of uniform diameter throughout its length, terminating in a slightly projecting nipple 25 on the upper face of the nut which engages the rubber washer or packing 26 at the attaching end of the pressure gage, and forming a gas tight joint therewith in adjusted position. To support and hold the gage in position a pair of spring arms 27 are secured upon the upper face of the nut and are provided with inwardly struck projections 28, which engage the shoulder 20 of the thimble 21 of the gage.

In the modification illustrated in Fig. 5, the construction is the same as in the modification just described, with the exception that a spring device of different character is employed to hold the gage in adjusted position. For this purpose, I have here shown a spring fork 29 secured on the upper face of the nut, the legs of the fork straddling the gage and overlying the shoulder 19 of the thimble in adjusted position. To apply the gage to the nut in this construction, the lower end is positioned over the nipple 25 and the gage then swung up from the side.

Obviously the invention is not limited to the particular type of gage illustrated nor to the particular forms of construction shown. Various modifications of the device will readily be suggested. The features of the invention which present themselves most conspicuously are the provision of a nut adapted to be adjusted in the spark plug aperture of an explosion engine cylinder; a seat on the nut for the tire gage and, preferably, means for holding the gage to its seat during the test compression in the cylinder.

I claim as my invention:—

1. The combination of a pressure gage having a thimble at its attaching end, with a nut exteriorly threaded to form a screw connection with a threaded aperture in the cylinder of an explosion engine, said nut being longitudinally perforated and having an internal shoulder to receive a compressible washer, in combination with a washer on said shoulder against which the lower end of the gage is pressed when the upper edge of the thimble is flush with the upper surface of the nut, and a latch pivoted on the upper face of the nut adapted to be swung into engagement with the upper end of the thimble to hold the gage temporarily in adjusted position, substantially as described.

2. For use in combination with a pressure gage having a thimble at its attaching end, a new article of manufacture comprising a nut exteriorly threaded to form a screw connection with a threaded aperture in the cylinder of an explosion engine, said nut being longitudinally perforated and internally shouldered to receive a compressible washer, in combination with a washer on said shoulder against which the lower end of the gage is pressed when the thimble is flush with the upper surface of the nut, together with a latch on said nut adapted to engage the upper end of the thimble and hold the gage temporarily in adjusted position, substantially as described.

In testimony whereof I have signed my name to this specification, in the presence of two subscribing witnesses.

WILLIAM A. ALLEN.

Witnesses:
E. GRUENING,
GEORGE A. OVENS.